A. R. HAVENER.
HOPPER.
APPLICATION FILED MAR. 4, 1918.

1,277,721.

Patented Sept. 3, 1918.
2 SHEETS—SHEET 1.

Inventor:
Arthur R. Havener
By his attorney,

UNITED STATES PATENT OFFICE.

ARTHUR R. HAVENER, OF WAYLAND, MASSACHUSETTS, ASSIGNOR TO JUDSON L. THOMSON M'F'G CO., A CORPORATION OF MASSACHUSETTS.

HOPPER.

1,277,721.

Specification of Letters Patent.

Patented Sept. 3, 1918.

Application filed March 4, 1918. Serial No. 220,194.

*To all whom it may concern:*

Be it known that I, ARTHUR R. HAVENER, a citizen of the United States, residing at Wayland, in the county of Middlesex and State of Massachusetts, have invented new and useful Improvements in Hoppers, of which the following is a specification.

This invention relates to a hopper for separating articles from a mass of the same contained in said hopper and feeding them one by one to a raceway. The hopper is particularly adapted to feed disk-shaped articles of the form known as "rivet caps" and to feed the particular form of rivet cap which has a recess in one face thereof and an inwardly projecting annular flange surrounding said recess.

The invention is an improvement upon the invention set forth in applicant's U. S. Letters Patent No. 1,130,898, patented March 9, 1915, hopper, and No. 1,157,306, patented October 19, 1915, hopper for feeding rivet caps.

The improvement consists, first, in the specific form of the inclined upper face of the picker plate. It has been found in certain cases that the rivet caps when being carried around by the picker plate would stick to the inclined upper face of said picker plate and sometimes cause trouble and applicant has conceived the idea of having the inclined upper face of the picker plate adjacent the periphery thereof convexly curved in cross section and by such formation of the picker plate the difficulty of the rivet caps sticking to the surface of the plate is overcome.

Another object of the invention is to construct the casing of the hopper and the picker plate thereof in such a manner that they may be readily detached from the picker plate driving shaft and furthermore to drive the picker plate frictionally so that in case of any obstruction to the rotation of the picker plate it will come to a standstill while the mechanism which drives it continues to rotate.

To these ends the invention consists in the combination and arrangement of parts set forth in the following specification and particularly pointed out in the claims thereof.

Referring to the drawings.

Like numerals refer to like parts throughout the several views of the drawings.

Figure 1:
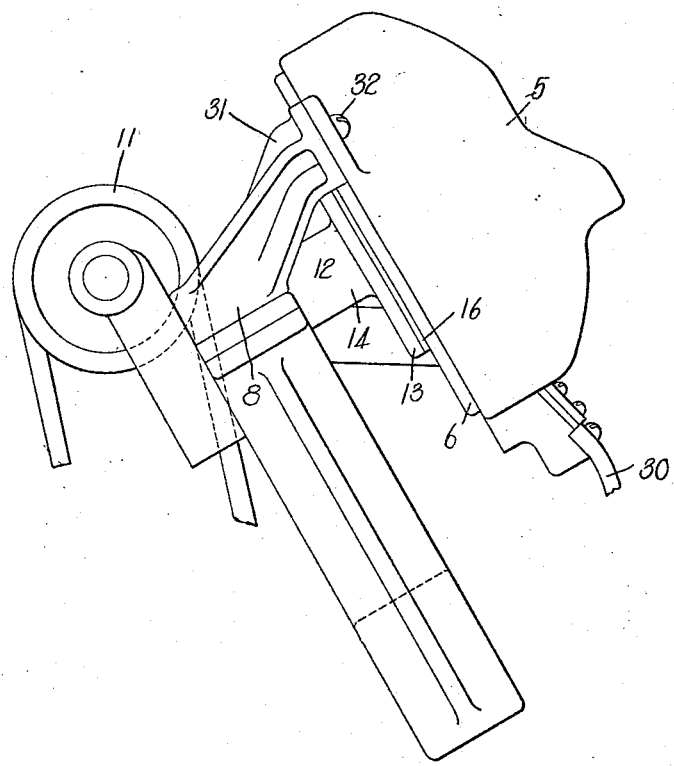
Figure 1 is a side elevation of a hopper embodying my invention and the mechanism by which it is driven.

In the drawings, 5 is the hopper casing, 6 is the picker plate and 7 the rotary shaft by which the picker plate is driven. The shaft 7 is journaled to rotate in a bracket 8 and has a rotary motion imparted thereto by a worm gear 9 which is driven by a worm 10 to which a rotary motion is imparted by a pulley 11.

The picker plate 6 is frictionally driven by a driving member 12 which consists of a disk 13 and a hub 14, the hub being fastened by a pin 15 to the shaft 7. A collar 16, preferably of fiber, is interposed between the disk 13 and the picker plate 6. Said picker plate 6 is loosely mounted upon the shaft 7 and is yieldingly held against the collar 16 by pins 17 which are located in holes 18 provided in a collar 19. The pins 17 are pressed against the picker plate 6 by springs 20 which bear at one end against the pins 17 and at the other end against a cross-pin 21, which fastens the collar 19 to the shaft 7.

The collar 19 is located upon the shaft 7 on the opposite side of the picker plate from that upon which the driving member 12 is located and is attached to said shaft by pushing the collar onto the end of the shaft, with the cross-pin 21 in the longitudinal portion of the L-shaped slots 22. When the collar has been forced to the left (Fig. 2) to a sufficient extent to cause the pin 21 to come into alinement with the transverse portions of said slots the collar is turned until the pin 21 bottoms in said transverse portions.

Figure 2:
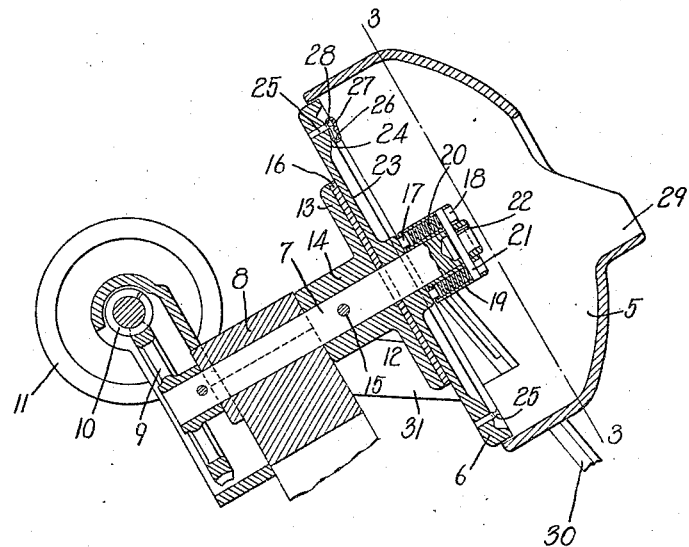
Fig. 2 is a sectional elevation of the same.
Figure 3:
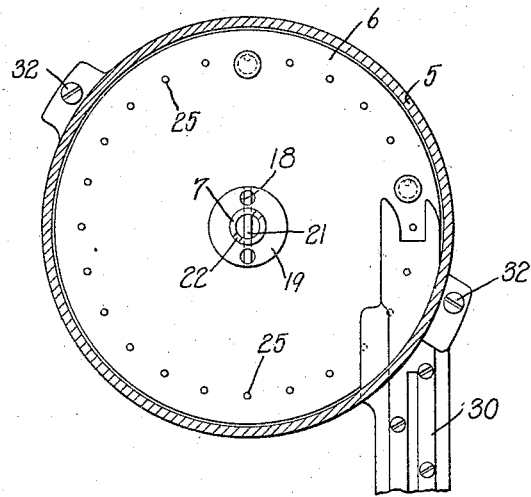
Fig. 3 is a sectional elevation taken on line 3—3 of Fig. 2.

The upper face 23 of the picker plate 6 is inclined and has an annular portion 24 which is convexly curved in cross section, see Fig. 2. This convexly curved portion is preferably adjacent to the periphery of the picker plate.

A series of projections 25, preferably in the form of pins, are provided upon the picker plate 6 and project from said convexly curved portion 24. Each of said projections is so formed as to be adapted to project into a recess 26 in a rivet cap 27 between the edge of the flange 28 and the center of said cap, as set forth in said Letters Patent.

The hopper casing 5 is provided with an opening 29 through which the caps are inserted into said casing in mass. A raceway 30 leads out of said hopper casing 5 and said hopper casing is detachably fastened to a stationary support consisting of a bracket 31 by means of screws 32. The outer end of the bracket 31 is located at one side of the casing 5 and extends across the picker plate 6 outside the periphery thereof, so that the hopper casing 5 may be removed and also so that the picker plate may be removed from the shaft 7 with very little difficulty.

The general operation of the hopper and its driving mechanism, hereinbefore specifically described, is as follows: The rivet caps are placed in the hopper casing 5 and are located in mass in the lower portion of said hopper. The picker plate is frictionally driven by the shaft 7 and driving member 12 through contact with the friction collar 16. The shaft 7 is rotated by means of the worm gear 9, worm 10 and pulley 11. The rivet caps are taken from the mass in the bottom of the casing 5 by the picker plate 6 and its pins 25 and delivered to the raceway 30 in the manner set forth in said Letters Patent. It will be seen that if any rivet cap which is not caught upon one of the pins, is carried up on the picker plate it will slide off of the convexly curved annular portion of the upper face of said picker plate and back into the mass of rivet caps at the bottom of the hopper casing, as it only has a very slight portion of its surface in contact with said convexly curved portion of the upper face of the picker plate and, therefore, will not stick to it, as is often found to be the case where the inclined upper face of the picker plate is flat, especially throughout that portion of said upper face from which the pins 25 project.

I claim:

1. A hopper for feeding articles having, in combination, a casing, and a cylindrical picker plate rotatably mounted in said casing and having an inclined upper face, an annular portion of said upper face extending entirely around said picker plate and being convexly curved in cross section throughout its entire length.

2. A hopper for feeding articles having, in combination, a casing, and a cylindrical picker plate rotatably mounted in said casing and having an inclined upper face, a portion of said upper face adjacent its periphery and extending entirely around said picker plate being convexly curved in cross section throughout its entire length.

3. A hopper for feeding articles provided with a recess in one face thereof having, in combination, a casing, a picker plate rotatably mounted in said casing and having an inclined upper face, an annular portion of said upper face being convexly curved in cross section and a projection on said convexly curved portion of said upper face arranged to project into said recess in one of said articles.

4. A hopper for feeding articles having, in combination, a rotary shaft, a stationary casing, a picker plate rotatably mounted on said shaft and within said casing, a driving member fast to said shaft on one side of said picker plate and means located on the other side of said picker plate to hold said picker plate against said driving member, whereby said picker plate may be frictionally driven.

5. A hopper for feeding articles having, in combination, a rotary shaft, a stationary casing, a picker plate rotatably mounted on said shaft and within said casing, a driving member fast to said shaft on one side of said picker plate and yielding means adapted to hold said picker plate against said driving member, whereby said picker plate may be frictionally driven.

6. A hopper for feeding articles having, in combination, a rotary shaft, a stationary casing, a picker plate rotatably mounted on said shaft and within said casing, a driving member fast to said shaft on one side of said picker plate, a collar fast to said shaft on the opposite side of said picker plate and spring actuated pins in said collar adapted to bear against said picker plate, whereby said picker plate may be frictionally driven.

7. A hopper for feeding articles having, in combination, a rotary shaft, a stationary casing, a picker plate rotatably mounted on said shaft and within said casing, a disk fast to said shaft on one side of said picker plate, a friction collar interposed between said disk and said picker plate and yielding means on said shaft on the opposite side of said picker plate adapted to hold said picker plate against said friction collar, whereby said picker plate may be frictionally driven.

8. A hopper for feeding articles having, in combination, a rotary shaft, a casing, a picker plate rotatably mounted on said shaft and within said casing, a stationary support to which said casing is detachably fastened, said support being located at one side of said casing and extending across said picker plate outside the periphery thereof, a driving member fast to said shaft and means to hold said picker plate against said driving member, whereby said picker plate may be frictionally driven.

9. A hopper for feeding articles provided with a recess in one face thereof having, in combination, a casing, a picker plate rotatably mounted in said casing and having an inclined upper face, an annular portion of said upper face being convexly curved in cross section and a series of pins on said convexly curved portion of said upper face, each of said pins arranged to project into said recess in one of said articles.

In testimony whereof I have hereunto set my hand in presence of two subscribing witnesses.

ARTHUR R. HAVENER.

Witnesses:
CHARLES S. GOODING,
SYDNEY E. TAFT.

Copies of this patent may be obtained for five cents each, by addressing the "Commissioner of Patents, Washington, D. C."